(12) United States Patent
Yeung (10) Patent No.: US 8,284,307 B1
(45) Date of Patent: Oct. 9, 2012

(54) METHOD FOR PROCESSING DIGITAL VIDEO FIELDS

(75) Inventor: Lawrence S. Yeung, Fremont, CA (US)

(73) Assignee: Marseille Networks, Inc., Santa Clara, CA (US)

( * ) Notice: Subject to any disclaimer, the term of this patent is extended or adjusted under 35 U.S.C. 154(b) by 173 days.

(21) Appl. No.: 12/925,927

(22) Filed: Nov. 1, 2010

(51) Int. Cl.
*H04N 7/01* (2006.01)

(52) U.S. Cl. ........................................ 348/441

(58) Field of Classification Search .......... 348/441, 348/448, 449, 452, 459, 700
See application file for complete search history.

(56) References Cited

U.S. PATENT DOCUMENTS

| | | | | |
|---|---|---|---|---|
| 5,943,099 A * | 8/1999 | Kim | | 348/448 |
| 5,959,681 A * | 9/1999 | Cho | | 348/452 |
| 6,822,691 B1 * | 11/2004 | Kim et al. | | 348/452 |
| 6,922,214 B1 * | 7/2005 | Weston | | 348/448 |
| 7,075,581 B1 * | 7/2006 | Ozgen et al. | | 348/448 |
| 7,224,399 B2 * | 5/2007 | Song | | 348/452 |
| 7,349,029 B1 * | 3/2008 | Chou | | 348/448 |
| 7,362,377 B2 * | 4/2008 | Caviedes | | 348/452 |
| 7,414,671 B1 * | 8/2008 | Gallagher et al. | | 348/625 |
| 7,468,754 B2 * | 12/2008 | Carlsgaard et al. | | 348/448 |
| 7,701,508 B2 * | 4/2010 | Wang et al. | | 348/452 |
| 8,120,702 B2 * | 2/2012 | Matsuoka | | 348/441 |
| 8,120,703 B2 * | 2/2012 | Adams | | 348/448 |
| 8,165,208 B2 * | 4/2012 | Chang et al. | | 375/240.16 |

* cited by examiner

*Primary Examiner* — Paulos Natnael (57) ABSTRACT

A system or a method that produces a similarity (or a differential) value that is used to indicate whether two video fields are either similar or not. The system or method assigns an index value to the current field based on the similarity (or a differential) value. The system or method determines how to process further the current field based on whether the assigned index value comprises an even or an odd number. The system or method processes the current field with the immediately preceding field if the current field's assigned index is an even number, and with the immediately following field if the current field's assigned index is an odd number. The system or method generates at least one output video frame that is at least twice the resolution of the current field being processed.

21 Claims, 5 Drawing Sheets

Prior Art
Fig. 1

Prior Art

Fig. 5

METHOD FOR PROCESSING DIGITAL VIDEO FIELDS

TECHNICAL FIELD

The subject of this application generally relates to the field of digital image processing and more particularly to processing of fields of a digital video image.

BACKGROUND

Traditional video systems using video standards such as NTSC, SECAM or PAL have used interlaced fields of captured video representing objects or panorama in motion. Interlacing of fields was needed in order to overcome the bandwidth limitations of early video and broadcasting standards and to match the properties of cathode ray tubes (CRT) screens. The horizontal scan lines of each interlaced frame are numbered consecutively and partitioned into two fields: the even field, or top field, consisting of the even-numbered lines (0, 2, 4 . . . ) and the odd field, or bottom field, consisting of the odd-numbered lines (1, 3, 5 . . . ). For example, the even field of the first frame of a video recording is displayed first followed by the odd field of the first frame. Subsequently, the even field of the second frame is displayed followed by the odd field of the second frame, and so on. Most current electronic display panels or monitors displays progressively each frame of captured video representing objects or panorama in motion, where each frame is completely displayed before the start of the succeeding frame. For example, all of the horizontal scan lines of the first frame are displayed followed by all of the horizontal scan lines of the second frame, and so on.

A video camera captures a scene for a specific duration of time and produces in accordance with a video standard many sequential frames or fields, each of which is a representative digital image of the scene at a particular moment in time. Normally in progressive video systems, each digital image is referred to as a frame having a defined number of horizontal and vertical pixels. The number of vertical pixels corresponds to the number of horizontal scan lines. A frame rate is also specified that represents the number of frames being captured or displayed per second. Normally a sixty fields per second is specified for United States television broadcast using interlaced NTSC video standard. Thus, a thirty frames per second video source can be used to generate the sixty field by decompiling each frame into top and bottom fields. The film industry have standardized on twenty-four frames per second. Therefore, in order to broadcast a movie having twenty-four frames per second video using interlaced TV standards a conversion process must be applied to produce sixty fields per second video. In addition, a progressive video display system capable of displaying sixty, seventy-five or one hundred-twenty frames per second, which are easily available on the market nowadays, is required to perform a procedure to appropriately de-interlace the received sixty fields per second to produce video frames at the higher frame rate with minimal distortion or artifacts and remain cost effective.

Consequently, how the video frames are generated and constructed provide for how they should be processed and displayed so that the original scene is faithfully reproduced when these video frames are displayed in sequence. In order to reproduce the original scene timing, each video frame, within the sequence of frames, must be reproduced and displayed in a predefined amount of time that matches the time allotted to its capture, and as mandated by the video standard being implemented. Hence, the time required to process and display each pixel is limited and finite. Electronic display devices resolution is specified as having X by Y pixels for each frame, and by the vertical refresh rate of how many frames per second can be displayed. The higher the resolution of the electronic display device is, the better the image that is being reproduced, this includes total number of pixels displayed per frame and total number of frames per second. As the electronic display panel technology advances to an ever-higher resolution, a bigger challenge to the device electronics is to be able to process data information for each pixel within an ever-smaller amount of time.

The processing demands on electronic circuits for High-Definition television (HD TV), e.g. 1,920 pixels wide and 1,080 pixels high, is much greater than a Standard-Definition television (SD TV), e.g. 720 pixels wide and 480 pixels high. The next generation of digital TVs, recently developed, will be able to display four times the high definition resolution of current HD TV sets. This Quad-HD set is capable of displaying 3,840 pixels wide and 2,160 pixels high. This presents a challenge to the processing circuitry, where the input image resolution, type, or standard determines additional processing power needed to display properly the image at the high resolution. This especially important if the input image content having sixty interlaced fields of an original twenty-four frames per second film is to be displayed using a HD or Quad HD electronic display panel.

The need arises to provide an electronic system capable of efficiently and appropriately reconstructing the correct sequence of fields of a video recording so that the video recording is reproduced and displayed faithfully using a high-resolution electronic display panel. Marseille Networks' 4×HD™ video technology delivers the ability to process digital images to be displayed in 3840×2160 resolution, while selectively removing artifacts and preserving stunning image details. Furthermore, Marseille Networks is the first to introduce Quad-HD solution to home theater systems. Marseille Networks' 4×HD™ video technology provide an efficient system with ample flexibility and processing power for blending, scaling and displaying various types of video frames or fields, including High-Definition video streams, to be displayed over Quad-HD or high-resolution display panel.

DETAILED DESCRIPTION

The present description may relate to a system or a method that detects a similarity between a current field and a previous field, and assign a field index value to the current field being received or processed. The system or method determines how to process further the current field based on whether the assigned index value comprises an even or an odd number. Some aspects of the present description relates to the processing of digital video fields to generate output digital video frames to be displayed using high-resolution electronic display panel. Some other aspects of the present description relates to recombining a specific video field with the immediately preceding video field or the immediately following video field to generate one output video frame. Particularly, some aspects of the present description may be applied to generate at least sixty video frames using sixty interlaced video fields, and each video frame comprises at least twice the resolution of a video field.

The present disclosure and the various features and advantageous details are explained more fully with reference to the nonlimiting embodiments that are illustrated in the accompanying drawings and detailed in the following description. Descriptions of well-known processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concepts will become apparent to those of ordinary skill in the art from this disclosure. Other features and associated advantages will become apparent with reference to the following detailed description of specific embodiments in connection with the accompanying drawings.

The term "coupled" is defined as connected, although not necessarily directly, and not necessarily mechanically. The terms "a" and "an" are defined as one or more unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features.

Furthermore, a device or structure that is configured in a certain way is configured in at least that way, but may also be configured in ways that are not listed. In particular, "video" (and any form of associated words with video, such as "digital video", "video field", "video frame", "digital video field", "digital video frame", "analog video") may take on various resolution and format of different video standard and may take the form of electrical, magnetic, electromagnetic, or optical signals capable of being stored transmitted, transferred, combined and otherwise manipulated through software, hardware, firmware or any combination thereof. Various operations may be described as a series of multiple steps so that it may be helpful to understand the present invention. However, it should not be concluded that these operations are necessarily processed in the order described. In fact, various operations may be performed or executed concurrently while achieving the same outcome. Thus, it should not be construed or implied that various operations are order dependent unless specifically stated otherwise.

Figure 1:
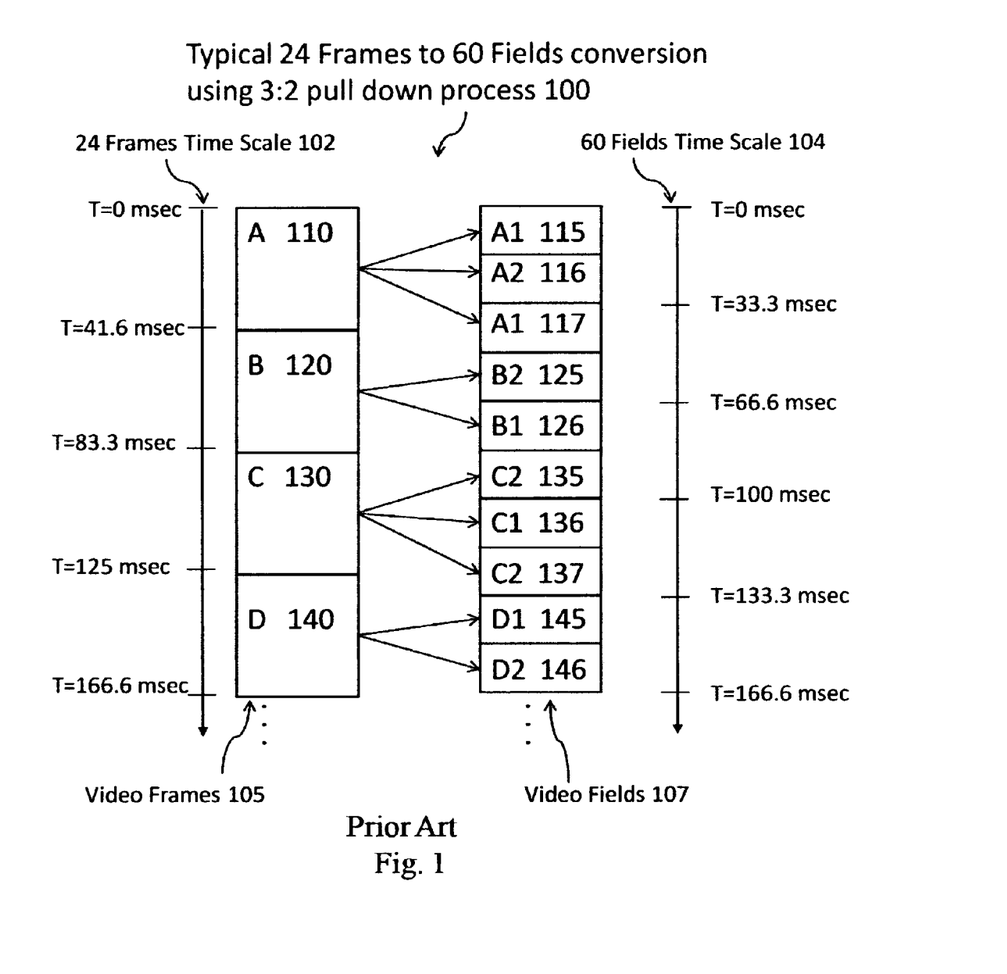
FIG. 1 shows a typical twenty-four film source frames per second to sixty fields per second conversion using 3:2 pull down process.

An exemplary and typical conversion process using 3:2 pull down is shown in FIG. 1, where Video Frames 105 represents the video source material based on twenty-four frames per second and Video Fields 107 represents the output fields based on sixty fields per second. For NTSC video standard, it is exactly 59.94 fields per second. Normally, this process is used to generate Video Fields 107 to be used with interlaced video equipment, where the processing or transmission bandwidth is limited. Starting at time T=0 and ending at T=41.6 mSec, a first video frame A 110 is used to generate three video fields, namely A1 115, followed by A2 116, and followed by A1 117, which is a repeat of the video field A1 115, as shown in FIG. 1. Each of the video fields 107 comprises either the even or the odd numbered video lines of the corresponding Video Frame 105. In this case, the top field A1 115, also may be referred to as "first field" or "even field", of the video frame A 110 comprises the even numbered video lines (0, 2, 4 . . . ). The bottom field A2 116, also may be referred to as "second field" or "odd field", of the video frame A 110 comprises the odd numbered video lines (1, 3, 5 . . . ). Since the top or bottom field comprises half the resolution of the source frame, then 16.6 mSec is the time needed for any one of the top and bottom fields to be displayed. Thus, the first three fields generated starts at T=0 and ends at T=50 msec, which is longer than the 41.6 mSec time needed for the video frame A 110. One can easily see that every two frames generate five fields, and the process repeats.

The next video frame B 120, starting at time T=41.6 and ending at T=83.3 mSec, is decomposed into top field B2 125 and bottom field B1 126. However, the bottom field B2 125 is transmitted first followed by the top field B1 126. Thus, the fourth and fifth generated fields starts at T=50 mSec and ends at T=83.3 mSec, at which point both the source video frames 105 and the output video fields 107 are aligned in time. Thus the name 3:2 pull down where three fields are generated from a first frame followed by two fields from the next frame, and so on. We have thus far generated five consecutive video fields in the following order (A1 115, A2 116, A1 117, B2 125, and B1 126) at a rate of sixty fields per second. The original two video frames A 110, and B 120 were generated at a rate of twenty-four frames per second.

Similarly, the next two video frames C 130 and D 140 are used to generate the next five consecutive video fields in the following order (C2 135, C1 136, C2 137, D1 145, and D2 146). Such system and methods that performs the 3:2 pull down process have been used to provide a capability to transmit and/or display, one video field at a time, a twenty-four frames per second film-sourced material using sixty interlaced fields per second systems, e.g. monitors or televisions.

Figure 2:
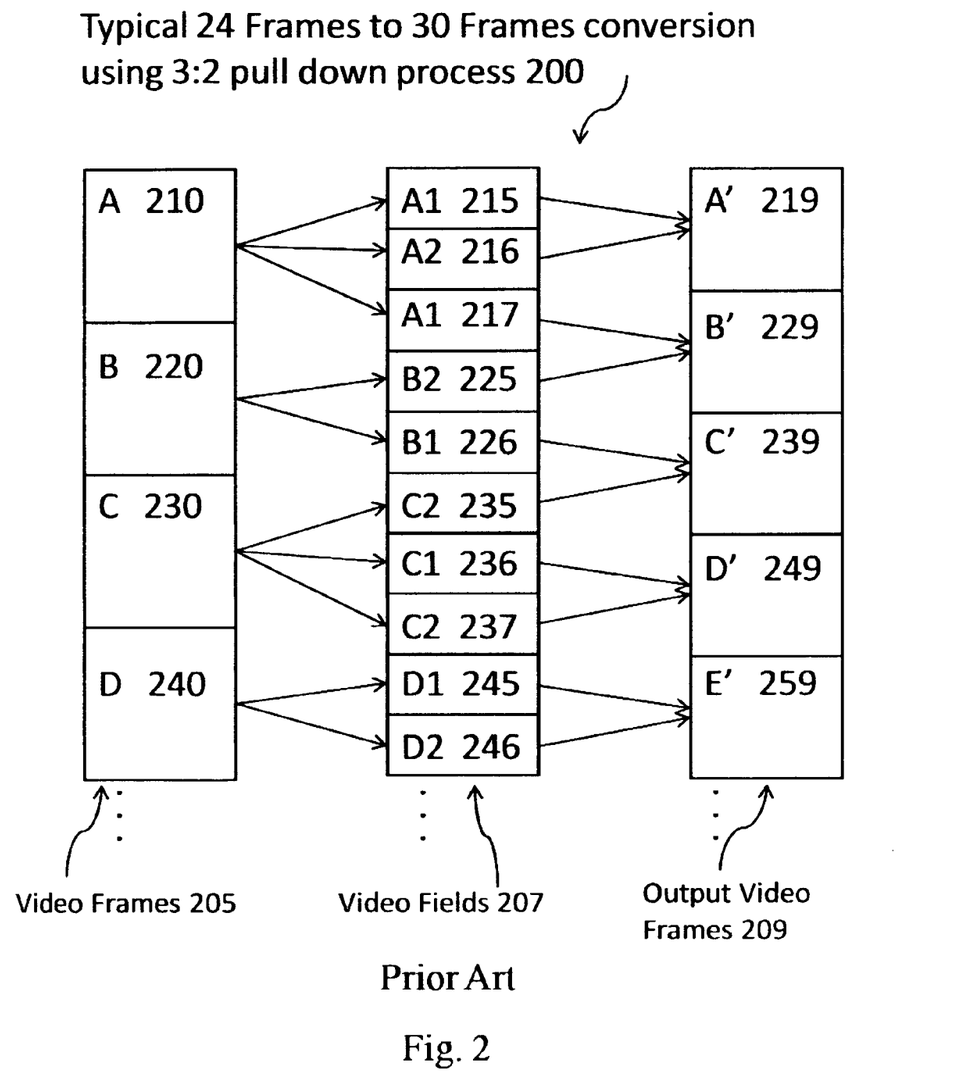
FIG. 2 shows a typical twenty-four film source frames per second to thirty frames per second conversion using 3:2 pull down process.

Another exemplary and typical conversion process using 3:2 pull down is shown in FIG. 2, where the source material is based on twenty-four Video Frames 205 per second and a thirty Output Video Frames 209 per second are generated for transmission. For NTSC video standard, it is exactly 29.97 frames per second. Normally, this process starts the same way as described above in paragraphs [0016] and [0017], where four video frames A 210, B 220, C 230, and D 240 are used to used to generate ten video fields A1 215, A2 216, A1 217, B2 225, B1 226, C2 235, C1 236, C2 237, D1 245, and D2 246. However, in order to transmit thirty frames per second (instead of the sixty fields per second) each two consecutive fields are combined to generate one frame having twice the resolution of a single field. For example, the first top field A1 215 is combined with the bottom field A2 216 to generate a first video frame A' 219. The duration of the output video frame is 33.3 mSec, which is exactly twice that of a single video field. Subsequently, video frame B' 229 is generated by combining the top field A1 217 and the bottom field B2 225, and so on. The five consecutive video frames 209 are transmitted and/or displayed sequentially in the order of A' 219, B' 229, C' 239, D' 249 and E' 259.

Figure 3:
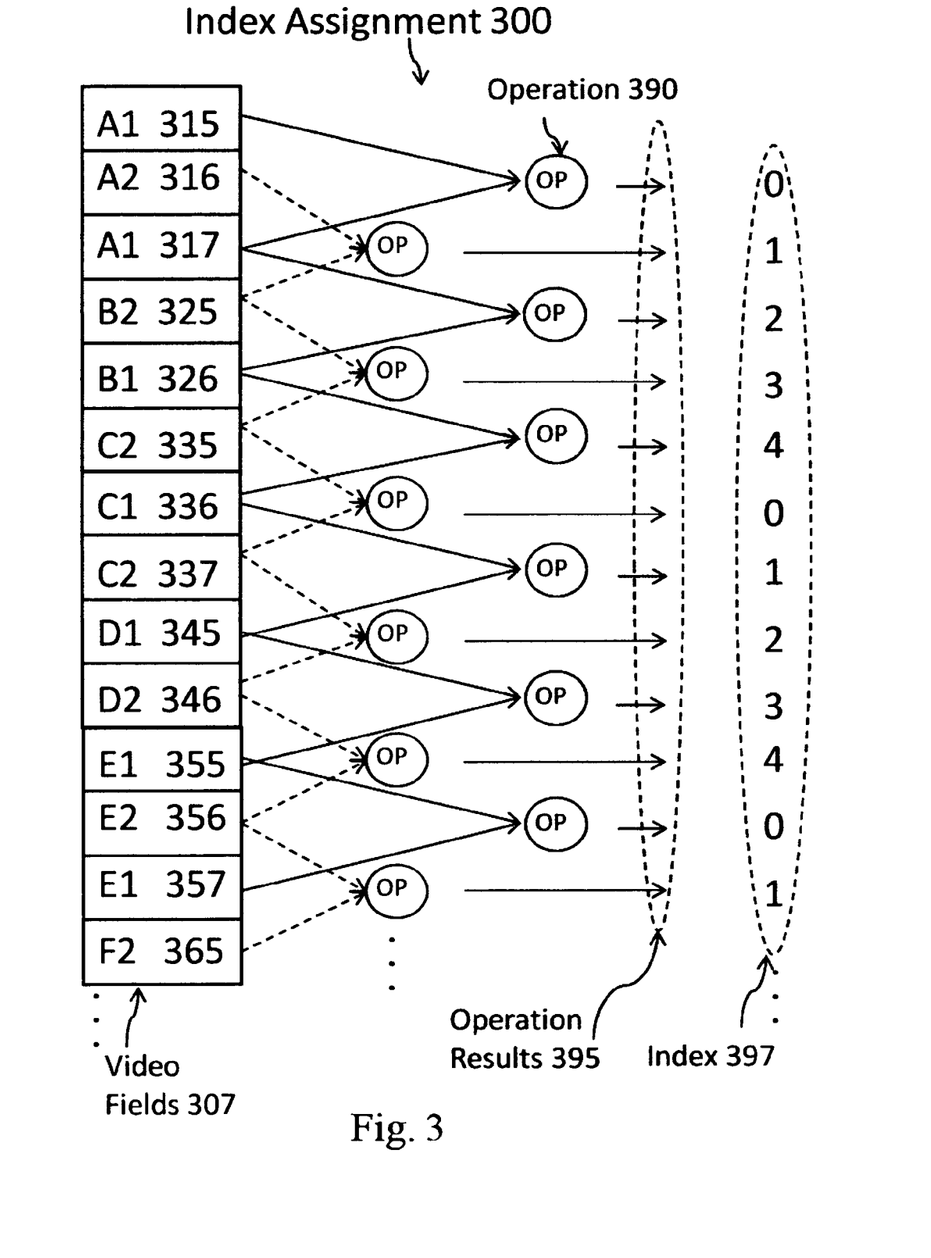
FIG. 3 shows a field index assignment process based on the result of an operation between two fields, in accordance with one embodiment.

Nowadays, a large number of electronic display systems implements a progressive method for displaying, storing or transmitting moving images in which all the lines of the first video frame are drawn in sequence, followed by the second video frame, and followed by the next video frame, and so on. There exists still a large amount of video source material that is available using the (relatively old) interlaced video system. Therefore, the need for an efficient and cost effective system to process, transmit and/or display video fields that have been produced and/or received in a particular sequence of a top video field followed by a bottom video field, e.g. 3:2 pull down. In accordance with one embodiment, FIG. 3 shows an Index Assignment 300 process to Video Fields 307 that are received at an exemplary rate of sixty video fields per second. These Video Fields 307 follow the same sequence as video fields generated using 3:2 pull down method, as described above, and as shown in FIG. 2. The first video field A1 315 is received followed by A2 316, and then the video field A1 317 is received, which is referred to as the current field. The video field A2 316 is referred to as the most recent field, and the video field A1 315 is referred to as the second most recent field. While the current field is being received a comparison Operation 390 is performed between the current field and second most recent field, where the Operation Results 395 delivers a video field similarity value. If the video field similarity value is small then the current field and the second most recent field are not similar. In addition, if the video field similarity value is large then the current field and the second most recent field are similar.

It should be noted here that in this example a repeat of the same field (A1 315 and A1 317) occur once every five consecutive fields. Therefore, every five comparison operation there should be only one Operation Results 395 that provide a large video field similarity value followed by four Operation Results 395 (for the subsequent fields) that provide a small video field similarity values. This pattern of one true followed by four false video field similarity values will be used to determine an index value that is to be assigned to the current field being processed. In this example, the first Operation 390 is performed between the current field (A1 317) and the second most recent field (A1 315). Theoretically, these two video fields are identical, however there may exist noise or other non-ideal interference that may change to a certain degree the similarity between them. Therefore, it is expected that the Operation Results 395 output a large video field similarity value. The index assignment process is initialized to zero every time a large video field similarity value is detected, and the index value of zero is assigned to the current video field A1 317. The index value is incremented by one for the next current field assignment.

Similarly, the next video field B2 325 is received and is the current field being processed. A second Operation 390 is performed now between the current field B2 325 and the second most recent field A2 316. It is expected that the Operation Results 395 output a small video field similarity value, indicating that the two fields are dissimilar. Therefore, the current index value of one is assigned to the current video field B2 325, and the index value is incremented by one for the next assignment. Similarly, the next three current fields are processed using Operation 390 that is performed between each of the then current field and the then second most recent field. It is expected that the Operation Results 395 output a small video field similarity value for all the next three Operation 390. Therefore, the index values of two, three, and four are assigned to B1 326, C2 335, and C1 336, respectively. Upon receiving the next field C2 337 and it is the current field being processed, then performing Operation 390 produces Operation Results 395 having a large video field similarity value. Consequently, the index assignment process is initialized to zero and the index value of zero is assigned to the current video field C2 337. The index assignment process repeats and the next four fields (D1 345, D2 346, E1 355, and E2 356) are assigned the index values of (one, two, three, and four respectively), and so on.

In accordance with one embodiment, the Operation 390 performed between the current field and the second most recent field produces Operation Results 395 that delivers a video field differential value. If the video field differential value is large then the current field and the second most recent field are not similar. In addition, if the video field differential value is small then the current field and the second most recent field are similar. In this example, the index assignment method will be just the inverse of the previous assignment based on the video field similarity value. The index assignment process is initialized to zero every time a small video field differential value is detected. The index value of zero is assigned to the current video field, and the index value increments by one for the next assignment, and so on.

In accordance with one embodiment, the Operation 390 between the current field and the second most recent field is performed after the current video field is received completely. In accordance with one embodiment, the Operation 390 between the current field and the second most recent field is performed while the current video field is being received. In accordance with one embodiment, the Operation 390 between the current field and the second most recent field is performed by operating on both fields' video data information that are stored in a memory device. In accordance with one embodiment, the Index Assignment 300 process is initialized to the number one, instead of zero, and incremented by one for each subsequent Operation Results 395. For example, the index values one, two, three, four, and five are assigned to five consecutive current fields Operation Results 395 having one large video field similarity value followed by four small video field similarity values, respectively. The process now repeats for subsequent Video Fields 307.

Figure 4:
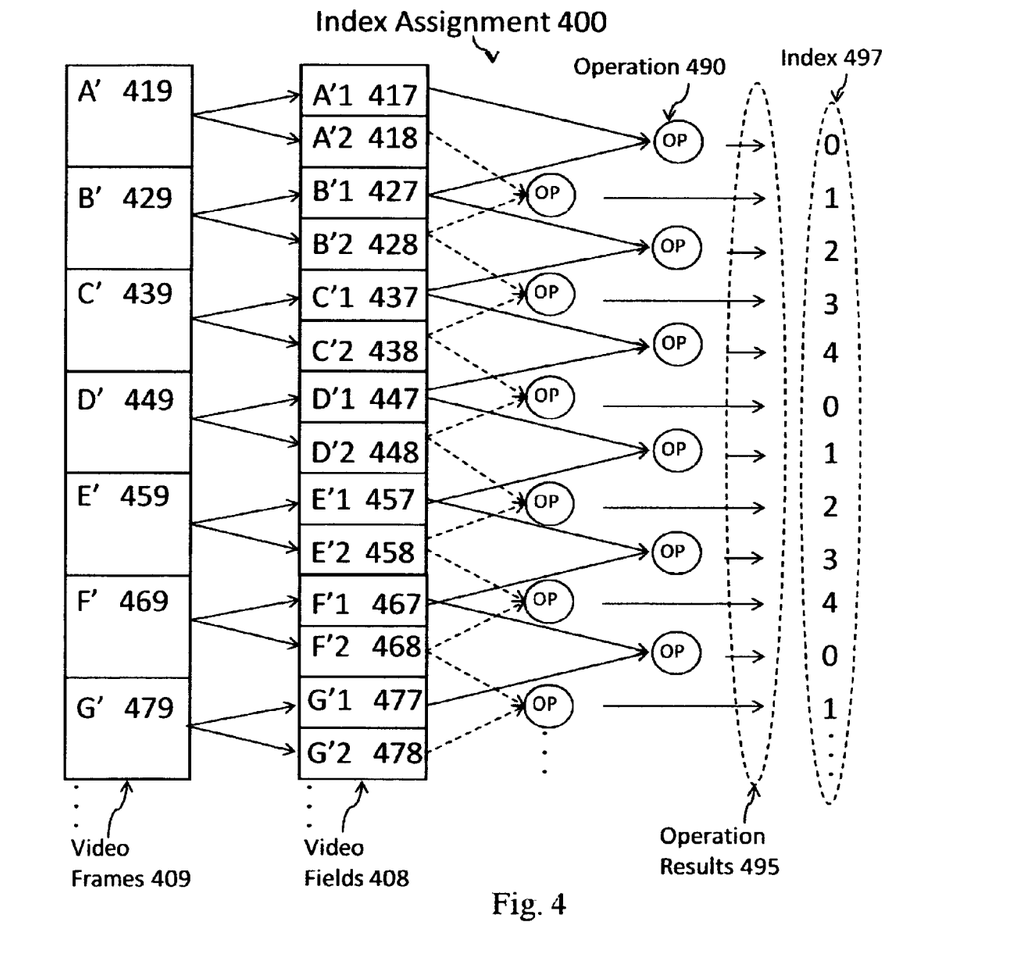
FIG. 4 shows a field index assignment process based on the result of an operation between two fields that are derived from two separate input frames, in accordance with one embodiment.

In accordance with one embodiment, FIG. 4 illustrates an Index Assignment 400 process that is performed when receiving video frames, and each video frame comprises a top field and a bottom field, where the overall sequence of fields are generated based on a 3:2 pull down process. The Index Assignment 400 process starts by decompiling each top and bottom fields from the sequence of Video Frames 409. For example, video frame A' 419 is decompiled to produce a top field A'1 417 and a bottom field A'2 418. Similarly, video frames B' 429, C' 439, D' 449, E' 459, F' 469 and G' 479 are decompiled into top fields B'1 427, C'1 437, D'1 447, E'1 457, F'1 467 and G'1 477, and bottom fields B'2 428, C'2 438, D'2 448, E'2 458, F'2 468 and G'2 478, respectively. In accordance with one embodiment, Operation 390 is performed between the current field and second most recent field, where the Operation Results 395 delivers a video field similarity value. If the video field similarity value is small then the current field and the second most recent field are not similar. In addition, if the video field similarity value is large then the current field and the second most recent field are similar. The index assignment process is initialized to zero every time a large video field similarity value is detected, the index value is assigned to the current field, and the index value increment by one for the next assignment step.

For example, Operation 390 is performed between the current field B'1 427 and the second most recent field A'1 417. It should be noted here that the Video Fields 408 are assumed to have been generated using 3:2 pull down before being combined into a thirty Video frames 409 per second, see FIG. 2. Thus, B'1 427 video field is same as A'1 417. Therefore, Operation Results 495 would yield a large field similarity value. Consequently, the index value is initialized to zero, and the index value of zero is assigned to the current field B'1 427, and the index value increments to one awaiting the results of the next Operation 490. As previously described in paragraphs [0020] and [0022], Operation 490 continues for each subsequent current field and producing Operation Results 495. The index value is assigned appropriately to the then current field. In this example the next four video fields B'2 428, C'1 437, C'2 438, and D'1 447 are assigned the index values one, two, three, and four respectively. The process continues for the remainder of the decompiled video fields D'2 448, E'1 457, E'2 458, F'1 467, F'2 468, G'1 477, and G'2 478, as shown in FIG. 4. In accordance with one embodiment, all current fields are processed based on each current field's assigned index value. Furthermore, the current field is processed using the immediately preceding field if the current field's assigned index value is an even number, i.e. 0, 2, 4 . . . , and the current field is processed using the immediately following field if the current field's assigned index value is an odd number, e.g. 1, 3, 5 . . . .

In accordance with one embodiment, Operation 490 between the current field and the second most recent field is performed after the current video field is received completely. In accordance with one embodiment, Operation 490 between the current field and the second most recent field is performed while the current video field is being received. In accordance with one embodiment, Operation 490 between the current field and the second most recent field is performed by operating on both fields' video data information that are stored in a memory device.

In accordance with one embodiment, the index assigning operation is initialized to the number one, and incremented by one for each subsequent operation, i.e. the index values are one, two, three, four, and five and repeat for subsequent Video Fields 408. In this example, all current fields are processed based on each current field's assigned index value, and a current field having an assigned index value that is an odd number (e.g. 1, 3, 5 . . . ) is processed using the immediately preceding field. However, if the current field's assigned index value is an even number (e.g. 0, 2, 4 . . . ), then the current field is processed using the immediately following field.

In accordance with one embodiment, Operation 490 performed between the current field and the second most recent field produces Operation Results 495 that delivers a video field differential value. If the video field differential value is large then the current field and the second most recent field are not similar. In addition, if the video field differential value is small then the current field and the second most recent field are similar. In this example, the index assignment method will be just the inverse of the previous method based on the video field similarity value. The index assignment process is initialized to zero every time a small video field differential value is detected. The index value of zero is assigned to the current video field, and the index value is incremented by one for the next assignment.

Figure 5:
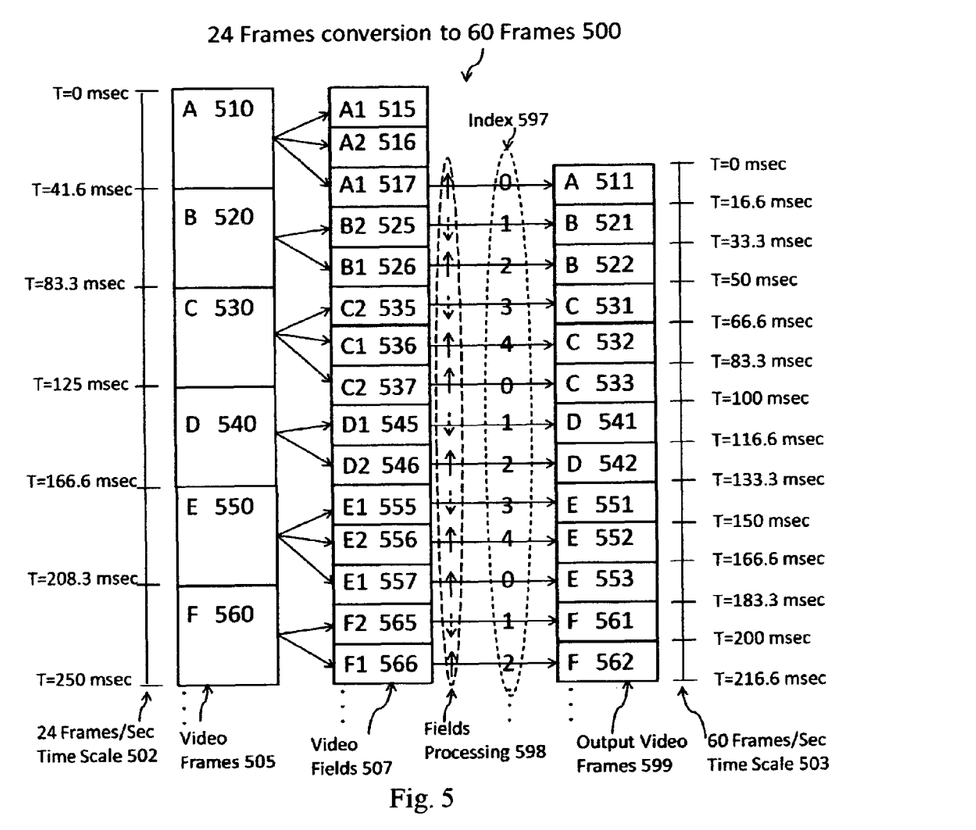
FIG. 5 shows an exemplary twenty-four film source frames per second to sixty frames per second conversion using indexed video fields that are processed based on the field index value of the current field being processed, in accordance with one embodiment.

Recent advances in the high-resolution electronic display technology permit the display of one hundred twenty video frames per second, and a higher resolution display panels are being developed continuously. FIG. 5 illustrates an overall process for converting a video source material having twenty-four frames per second to output video having sixty frames per second. The video source material is shown as Video Frames 505 and a 24 Frames/Sec Time Scale 502 provides timing details for each source video frame. The Output Video Frames 599 are shown next to a 60 Frames/Sec Time Scale 503. Each of the Output Video Frames 599 comprises a resolution that is similar to the source Video Frames 505 and twice that of any of the Video Fields 507. The Video Fields 507 are produced using 3:2 pull down process and transmitted or coupled (e.g. wirelessly, wired, or via a memory device) to a receiver. The Video Fields 507 are received, and each of which is assigned an Index 597 value in a similar ways as described in paragraphs [0020] through [0029]. Furthermore, the processing of each of the Video Fields 507 depends on whether the assigned index value is an even or an odd number. In this example, a current field is processed with the immediately preceding field if the current field's index value is even, and the current field is processed with the immediately following field if the current field's index value is odd. The video field A1 517 has an assigned index value of zero. Thus, the video field A1 517 is processed with the immediately preceding field A2 516, to produce the output video frame A 511. Similarly, the video fields B1 526, C1 536, C2 537, D2 546, E2 556, E1 557, and F1 566 are processed with the immediately preceding fields B2 525, C2 535, C1 536, D1 545, E1 555, E2 556, and F2 565, respectively, as denoted by the up arrows shown in FIG. 5 as Fields Processing 598. The resultant output video frames are B 522, C 532, C 533, D 542, E 552, E 553, and F 562. Similarly, the following video fields B2 525, C2 535, D1 545, E1 555, and F2 565 having an assigned index value that is an odd number will be processed with the immediately following field, as denoted with the down pointed arrow shown in Field Processing 598. A list of the video fields to be processed with the fields having an odd index value is: B1 526, C1 536, D2 546, E2 556, and F1 566, respectively. Hence, the output video frames B 521, C 531, D 541, E 551, and F 561 are produced, respectively.

It is important to know whether each of the video fields A1 517 and C2 537, having an index value of zero, is a top or a bottom field, respectively. In this example, the suffix number 1 or 2 after the letter name provides this information. However, when processing A1 517 and A2 516 it is important for the system to know which is a top video field and which is a bottom video field, so that proper processing of the horizontal scan lines of each field is performed. Normally, each video field comprise a top-field variable that when true it indicates that the field is a top field, and when the top-field variable is false it indicates that the field is a bottom field. Assuming, that A1 517 comprise a top-field=true, and that A2 516 comprise a top-field=false. Consequently, the sequence of horizontal lines of A1 517 will be used for the even numbered lines of the output video frame A 511, and the sequence of horizontal lines A2 516 will be used for the odd numbered lines of the output video frame A 511. This weaving process is a simple process to combine the video fields A1 517 and A2 516 to produce output video frame A 511. However, it is possible to specify various methods for combining, merging, or scaling A1 517 and A2 516 to produce the output video frame A 511 in a desired resolution or frame rate that is compatible with the video equipment being used to process or display the video content.

Furthermore, it should be noted here that while the resolution of the output video frame A 511 is twice that of video field A1 517, it is being processed and displayed during a 16.6 mSec time window, which the same amount of time it takes to display video field A1 517. Graphically shown, the output video frame A 511 should have been drawn using a box that is twice as large as that of video field A1 517 to reflect the higher resolution content. However, the relationship between each output video frame and its correspondent current video field would not be easily charted in FIG. 5. Moreover, the time slot during which each of the Output Video Frames 599 is displayed is still the same as that of one of the Video Fields 507.

In accordance with one embodiment, Operation 490 may be performed using various methods and procedures acting on each pixel of the current field and a similarly positioned pixel of the second most recent field. Operation 490 may be performed using various methods and procedures acting on group of pixels of the current field and a similarly positioned group of pixels of the second most recent field. In accordance with one embodiment, Operation 490 may be performed using a square error or a sum of absolute difference method to produce a field differential value, such that a small field differential value is indicative that both field are similar and a large differential value is indicative that both field are dissimilar. An exemplary mathematical representation of both methods is shown in eq. 1 and eq. 2 below. Other methods for computing the difference between the two fields may be used as well to achieve similar field differential value.

$$\text{Field Differential Value} = \Sigma_i^n \Sigma_j^m (X_{i,j} - Y_{i,j})^2 \qquad \text{eq. 1}$$

$$\text{Field Differential Value} = \Sigma_i^n \Sigma_j^m |X_{i,j} - Y_{i,j}| \qquad \text{eq. 2}$$

Where:

$X_{i,j}$ represent a pixel, of the current field, that is located at a vertical position (i), and a horizontal position (j).

$Y_{i,j}$ represent a pixel, of the second most recent field, that is located at a vertical position (i), and a horizontal position (j).

Furthermore, cross correlation method between a current field and second most recent field may be used to determine a field similarity value that is large if both fields are similar and small if both fields are dissimilar.

The exemplary embodiments as described in this disclosure are used to develop an efficient and cost effective method to process video fields and produce video frames that meet various specifications. The exemplary embodiments can also be practiced with certain modifications and alterations that those skilled in the art will recognize.

I claim:

1. A method for processing a sequence digital video fields, comprising:

receiving the sequence of digital video fields;

determining a current field similarity value for each current field that is being received with a second most recently received field, wherein a small value for the current field similarity value indicates that the current field is dissimilar to the second most recently received field, and a large value for the current field similarity value indicates that the current field is similar to the second most recently received field;

associating the current field similarity value with the current field;

determining a first sequence of five consecutive fields comprising a first field having a large current field similarity value followed by a second, third, fourth, and fifth consecutive fields each of which having a small current field similarity value;

assigning an index value starting at zero, incrementing by one, and ending at four to the first sequence of five consecutive fields, wherein the first field is assigned an index value of zero, and the second, third, fourth and fifth consecutive fields are assigned the index values of one, two, three and four, respectively;

processing each field having an even index value using an immediately preceding field, wherein the even index value corresponds to any one of the index values of zero, two, and four; and processing each field having an odd index value using an immediately following field, wherein the odd index value corresponds to any one of the index values of one, and three.

2. The method of claim 1, further comprising:

determining a first, second, third, fourth and fifth top-field values;

associating the first, second, third, fourth and fifth top-field values with the first, second, third, fourth and fifth fields of the first sequence of five consecutive fields, respectively, wherein each of the five consecutive fields is determined to be a top-field if its associated top-field value is true, and each of the five consecutive fields is determined to be a bottom-field if its associated top-field value is false.

3. The method of claim 2, wherein the processing of each field having an even index value using an immediately preceding field comprises:

generating a first processed digital video frame using the field having even index value and the immediately preceding field, wherein the first processed digital video frame comprises a resolution that is at least twice as large as the preceding field.

4. The method of claim 3, wherein the even numbered lines of the first processed digital video frame are generated using any one of the field having even index value and the immediately preceding field having a top-field value that is true, and the odd numbered lines of the first processed digital video frame are generated using any one of the field having even index value and the immediately preceding field having a top-field value that is false.

5. The method of claim 3, wherein the processing of each field having an odd index value using an immediately following field, comprises:

generating a second processed digital video frame using the field having odd index value and the immediately following field, wherein the second processed digital video frame comprises a resolution that is at least twice as large as the following field.

6. The method of claim 5, wherein the even numbered lines of the second processed digital video frame are generated using any one of the field having odd index value and the immediately following field having a top-field value that is true, and the odd numbered lines of the second processed digital video frame are generated using any one of the field having odd index value and the immediately following field having a top-field value that is false.

7. The method of claim 5, further comprising:

displaying the first and second processed digital video frames sequentially using an electronic display panel, wherein the first processed digital video frame is displayed first.

8. The method of claim 1, wherein the receiving of the sequence of digital video fields comprises:

receiving a first digital video field from the sequence of digital video fields, wherein the first digital video field corresponds to a current digital video field being received;

storing the first digital video field into a memory device;

receiving a second digital video field that follows immediately after the first digital video field, wherein the second digital video field corresponds to the current digital video field being received, and the first digital video field is the most recently received field;

storing the second digital video field into the memory device;

receiving a third digital video field that follows immediately after the second digital video field, wherein the third digital video field corresponds to the current digital video field being received, and the first digital video field is the second most recently received field; and storing the third digital video field into the memory device.

9. The method of claim 1, further comprising:

determining a second sequence of five consecutive fields comprising a sixth field having a large current field similarity value followed by a seventh, eighth, ninth, and tenth consecutive fields each of which having a small current field similarity value, wherein the second sequence of five consecutive fields follows immediately after the first sequence of five consecutive fields;

assigning an index value starting at zero, incrementing by one, and ending at four to the second sequence of five consecutive fields, wherein the sixth field is assigned an index value of zero, and the seventh, eighth, ninth, and tenth consecutive fields are assigned the index values of one, two, three and four, respectively;

processing each field having an even index value using an immediately preceding field, wherein the even index value corresponds to any one of the index values of zero, two, and four; and processing each field having an odd index value using an immediately following field, wherein the odd index value corresponds to any one of the index values of one, and three.

10. A method for processing a field of a stream of digital video fields, comprising:

receiving a continuous stream of fields from a digital video source;

storing into a memory device at least three consecutive fields from the stream of digital video fields, wherein the three consecutive fields comprise a current field that corresponds to the third received field, a most recent field that corresponds to the second received field, and a second most recent field that corresponds to the first received field;

comparing at least a first portion of the current field with at least a first portion of the second most recent field to determine a differential value for the current field, wherein a small differential value indicates that the current field is similar to the second most recent field, and a large differential value indicates that the current field is dissimilar to the second most recent field;

determining a first sequence of five consecutive fields, wherein a first field of the first sequence of five consecutive fields has one small differential value, and a second, third, fourth and fifth consecutive fields of the first sequence of five consecutive fields each of which having a large differential value;

assigning an index value starting at one, incrementing by one, and ending at five to the first sequence of five consecutive fields, wherein the first field is assigned an index value of one, and the second, third, fourth and fifth consecutive fields are assigned the index values of two, three, four, and five, respectively;

processing each field having an odd index value using an immediately preceding field, wherein the odd index value corresponds to any one of the index values of one, three, and five; and processing each field having an even index value using an immediately following field, wherein the even index value corresponds to any one of the index values of two, and four.

11. The method of claim 10, further comprising:

determining a first, second, third, fourth and fifth top-field values;

associating the first, second, third, fourth and fifth top-field values with the first, second, third, fourth and fifth fields of the first sequence of five consecutive fields, respectively, wherein each of the five consecutive fields is determined to be a top-field if its associated top-field value is true, and each of the five consecutive fields is determined to be a bottom-field if its associated top-field value is false.

12. The method of claim 11, wherein the processing of each field having an odd index value using an immediately preceding field comprises:

generating a first processed digital video frame using the field having odd index value and the immediately preceding field, wherein the first processed digital video frame comprises a resolution that is at least twice as large as the preceding field.

13. The method of claim 12, wherein the even numbered lines of the first processed digital video frame are generated using any one of the field having odd index value and the immediately preceding field having a top-field value that is true, and the odd numbered lines of the first processed digital video frame are generated using any one of the field having odd index value and the immediately preceding field having a top-field value that is false.

14. The method of claim 12, wherein the processing of each field having an even index value using an immediately following field, comprises:

generating a second processed digital video frame using the field having even index value and the immediately following field, wherein the second processed digital video frame comprises a resolution that is at least twice as large as the following field.

15. The method of claim 14, wherein the even numbered lines of the second processed digital video frame are generated using any one of the field having even index value and the immediately following field having a top-field value that is true, and the odd numbered lines of the second processed digital video frame are generated using any one of the field having even index value and the immediately following field having a top-field value that is false.

16. A method for processing a sequence of digital video frames, comprising:

a) receiving a first digital video frame from the sequence of digital video frames, wherein each digital video frame comprises a top and bottom digital video fields and is associated with a top-field value;

b) generating a top digital video field from the first digital video frame based on the first top-field value, wherein the top digital video field comprises all even numbered lines of the first digital video frame if the first top-field value is true, and the top digital video field comprises all odd numbered lines of the first digital video frame if the first top-field value is false;

c) generating a bottom digital video field from the first digital video frame based on the first top-field value, wherein the bottom digital video field comprises all odd numbered lines of the first digital video frame if the first top-field value is true, and the bottom digital video field comprises all even numbered lines of the first digital video frame if the first top-field value is false;

d) transmitting the top and bottom digital video fields sequentially, wherein the top digital video field is the first field to be transmitted;

e) repeating steps a) through d) for each subsequent digital video frame in the sequence of digital video frames;

receiving the transmitted digital video fields, one field at a time;

determining a current field similarity value for each current field that is being received with a second most recently received field, wherein a small value for the current field similarity value indicates that the current field is dissimilar to the second most recently received field, and a large value for the current field similarity value indicates that the current field is similar to the second most recently received field;

associating the current field similarity value with the current field;

determining a first sequence of five consecutive fields comprising a first field having a large current field similarity value followed by a second, third, fourth, and fifth consecutive fields each of which having a small current field similarity value;

assigning an index value starting at zero, incrementing by one, and ending at four to the first sequence of five consecutive fields, wherein the first field is assigned an index value of zero, and the second, third, fourth and fifth consecutive fields are assigned the index values of one, two, three and four, respectively;

processing each field having an even index value using an immediately preceding field, wherein the even index value corresponds to any one of the index values of zero, two, and four; and processing each field having an odd index value using an immediately following field, wherein the odd index value corresponds to any one of the index values of one, and three.

17. The method of claim 16, wherein the processing of each field having an even index value using an immediately preceding field comprises:

generating a first processed digital video frame by interlacing both fields horizontally, wherein the first digital video frame comprises a resolution that is at least twice as large as the preceding field.

18. The method of claim 17, wherein the processing of each field having an odd index value using an immediately following field, comprises:

generating a second processed digital video frame by interlacing both fields horizontally, wherein the second digital video frame comprises a resolution that is at least twice as large as the following field.

19. The method of claim 18, further comprising:

displaying the first and second processed digital video frames sequentially using an electronic display panel, wherein the first processed digital video frame is displayed first.

20. The method of claim 16, wherein the receiving of the sequence of digital video fields comprises:

receiving a first digital video field from the sequence of digital video fields, wherein the first digital video field corresponds to a current digital video field being received;

storing the first digital video field into a memory device;

receiving a second digital video field that follows immediately after the first digital video field, wherein the second digital video field corresponds to the current digital video field being received, and the first digital video field is the most recently received field;

storing the second digital video field into the memory device;

receiving a third digital video field that follows immediately after the second digital video field, wherein the third digital video field corresponds to the current digital video field being received, and the first digital video field is the second most recently received field; and storing the third digital video field into the memory device.

21. The method of claim 16, further comprising:

determining a second sequence of five consecutive fields comprising a sixth field having a large current field similarity value followed by a seventh, eighth, ninth, and tenth consecutive fields each of which having a small current field similarity value, wherein the second sequence of five consecutive fields follows immediately after the first sequence of five consecutive fields;

assigning an index value starting at zero, incrementing by one, and ending at four to the second sequence of five consecutive fields, wherein the sixth field is assigned an index value of zero, and the seventh, eighth, ninth, and tenth consecutive fields are assigned the index values of one, two, three and four, respectively;

processing each field having an even index value using an immediately preceding field, wherein the even index value corresponds to any one of the index values of zero, two, and four; and processing each field having an odd index value using an immediately following field, wherein the odd index value corresponds to any one of the index values of one, and three.

\* \* \* \* \*